United States Patent
Jenkinson

[15] 3,701,927
[45] Oct. 31, 1972

[54] LOCATION OF FAULTS IN CABLES
[72] Inventor: Frank Edward Jenkinson, Johannesburg, Republic of South Africa
[73] Assignee: Patented Devices (Proprietory) Limited, Reuven, Johannesburg, Republic of South Africa
[22] Filed: June 11, 1971
[21] Appl. No.: 152,158

[30] Foreign Application Priority Data
June 11, 1970 Republic of South Africa ................... 3973

[52] U.S. Cl. ........................................ 317/16, 324/52
[51] Int. Cl. ............................................. G01r 31/08
[58] Field of Search ........................... 317/16; 324/52

[56] References Cited
UNITED STATES PATENTS
2,565,307  8/1951  Harding et al. .............. 324/52
2,707,267  4/1955  Gavin .......................... 324/52

Primary Examiner—James D. Trammell
Attorney—Young & Thompson

[57] ABSTRACT

Apparatus for reducing the resistance of a high resistance fault between two cores or between one core and the sheath of an electrical cable comprising a first transformer having a high open circuit voltage rating and a low short circuit current rating and a second transformer having a low open circuit voltage rating and a high short circuit current rating. The two transformers are connected in series and across the two faulty cores or between the faulty and the sheath and their respective primary windings are energized. Initially the sum of the two secondary voltages will be applied to the cable to reduce the fault resistance. This will cause the fault current to increase. When the fault current increases beyond the short circuit current rating of the first transformer this transformer will zero leaving only the second transformer to burn the fault down to a point where conventional fault locating apparatus can be employed to locate the fault.

2 Claims, 1 Drawing Figure

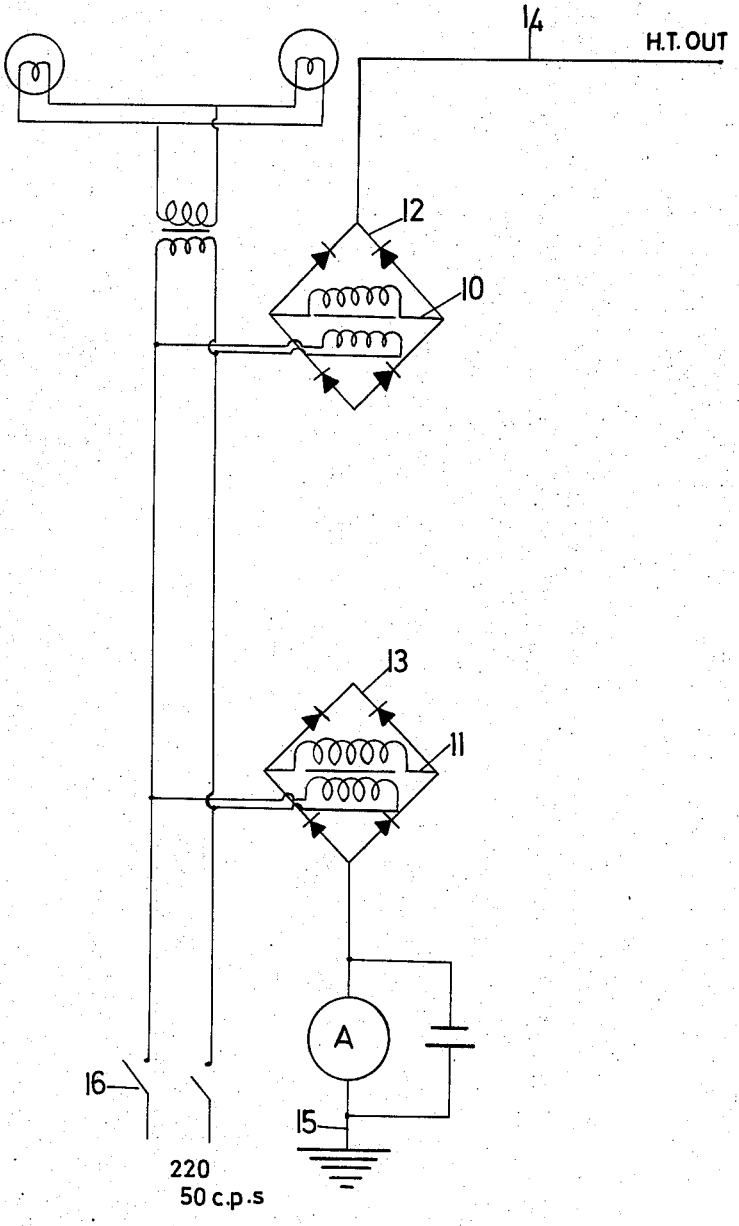

LOCATION OF FAULTS IN CABLES

This invention relates to the location of faults in electrical cables.

It is not uncommon for high resistance faults to appear in electrical cables. One example of such a fault would be where moisture has, say, entered the lead sheath of a paper-insulated cable through an opening and has initiated the breakdown of the insulation.

The difficulty about faults of this type is that their resistance is too high for the loop current of conventional fault locating apparatus. Conventional fault locating techniques cannot therefore be used until such time that the fault resistance has been reduced by a sufficient extent. The fault resistance may decrease through the effluxion of time but in most cases it is highly desireable that the fault be located as rapidly as possible.

It is therefore necessary to provide some means of accelerating the decrease of the fault resistance and it is an object of the present invention to provide apparatus for this purpose.

According to the invention apparatus for reducing the resistance of a high resistance fault in an electrical cable comprises a first transformer having a predetermined open circuit voltage rating and short circuit current rating, a second transformer having an open circuit voltage rating substantially lower than that of the first transformer and a short circuit current rating substantially higher than that of the first transformer, the secondary windings of the two transformers being adapted to be connected simultaneously and in series to the cable so that, initially, the sum of the two secondary voltages is applied to the cable to break down the fault, and that, as the fault resistance reaches a value which permits the flow of a current higher than that of the short circuit current rating of the first transformer, the first transformer will zero and leave only the second transformer to reduce the fault resistance to a value suitable for fault location purposes.

Further according to the invention there is provided means to rectify the secondary voltages of the two transformers before they are applied to the cable.

To illustrate the invention an embodiment thereof is described hereunder with reference to the accompanying circuit diagram.

In the diagram the device of the invention comprises in essence two transformers 10 and 11 each of which is provided with its own bridge rectifier 12 and 13.

The transformer 10 acts as a voltage generator as it has a high open circuit voltage and a low short circuit current. The transformer 11 acts as a current generator as it has a low open circuit voltage and a high short circuit current. Purely by way of example the transformer 10 could have the rating 220V/7KV RMS open circuit and 30 milliamps short circuit and the transformer 11 could have the rating 200/700 V RMS open circuit and 400 milliamps short circuit.

The primary windings of the two transformers are adapted to be connected to the electrical mains supply.

In use the two transformers 10 and 11 are connected in series as illustrated in the diagram with the conductor 14 being connected to the core under test and the conductor 15 being connected to ground or the cable sheath or another core as the case may be.

When the switch 16 is closed, the outputs of the two transformers, (7KV and 0.7KV in the example) are applied in series to the core under test. This will cause the fault to break down and the fault resistance will accordingly decrease.

As the fault resistance decreases, the fault current will increase until such time that it is in excess of the short circuit current rating of the transformer 10. At this point the transformer 10 will zero but transformer 11 will continue to apply its high current to the fault until such time that the fault is completely burned down. At this point, the fault resistance will be sufficiently low for conventional fault locating techniques to be employed to locate the fault.

In the event that the fault tends to re-seal after the transformer 10 has zeroed, the fault current will decrease (and not increase as before) and transformer 10 will then become operative again (either partially or completely) to suit the characteristics of the fault. In other words the apparatus continuously adjusts itself to any varying fault condition until complete carbonization or burning down of the fault is obtained.

We claim:

1. Apparatus for reducing the resistance of a high resistance fault in an electrical cable, comprising a first transformer having a predetermined open circuit voltage rating and short circuit current rating, a second transformer having an open circuit voltage rating substantially lower than that of the first transformer and a short circuit current rating substantially higher than that of the first transformer, and means for connecting the secondary windings of the two transformers simultaneously and in series to the cable so that, initially, the sum of the two secondary voltages is applied to the cable to break down the fault, and that, as the fault resistance reaches a value which permits the flow of a current higher than that of the short circuit current rating of the first transformer, the first transformer will zero and leave only the second transformer to reduce the fault resistance to a value suitable for fault location purposes.

2. Apparatus as claimed in claim 1 including means to rectify the secondary voltages of the two transformers before they are applied to the cable.

* * * * *